United States Patent
Cassidy

(10) Patent No.: US 7,171,509 B2
(45) Date of Patent: Jan. 30, 2007

(54) METHOD AND APPARATUS FOR HOST MESSAGING UNIT FOR PERIPHERAL COMPONENT INTERCONNECT BUSMASTER DEVICES

(75) Inventor: Bruce Michael Cassidy, Livermore, CA (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 10/042,809

(22) Filed: Jan. 9, 2002

(65) Prior Publication Data

US 2003/0131173 A1    Jul. 10, 2003

(51) Int. Cl.
*G06F 13/36* (2006.01)
*G06F 13/12* (2006.01)

(52) U.S. Cl. .......................... 710/308; 711/147
(58) Field of Classification Search ............... 710/220, 710/20, 305, 306, 308; 711/147, 148
See application file for complete search history.

(56) References Cited

U.S. PATENT DOCUMENTS

| | | | | |
|---|---|---|---|---|
| 4,862,350 A | * | 8/1989 | Orr et al. ................ | 709/213 |
| 5,142,683 A | * | 8/1992 | Burkhardt et al. ........ | 709/215 |
| 5,446,841 A | * | 8/1995 | Kitano et al. ............ | 709/213 |
| 5,574,863 A | * | 11/1996 | Nelson et al. ............ | 714/6 |
| 5,584,010 A | * | 12/1996 | Kawai et al. ............ | 711/117 |
| 5,617,537 A | * | 4/1997 | Yamada et al. .......... | 709/214 |
| 5,822,421 A | * | 10/1998 | Ryu ......................... | 379/225 |
| 6,055,579 A | * | 4/2000 | Goyal et al. ............. | 709/400 |
| 6,131,113 A | * | 10/2000 | Ellsworth et al. ........ | 709/213 |
| 6,237,108 B1 | * | 5/2001 | Ogawa et al. ............ | 714/6 |
| 6,564,271 B2 | * | 5/2003 | Micalizzi et al. ......... | 710/39 |
| 6,665,673 B1 | * | 12/2003 | Petersen et al. ......... | 707/10 |
| 2001/0023467 A1 | * | 9/2001 | Fishler et al. ............ | 710/126 |
| 2001/0032287 A1 | * | 10/2001 | Lai et al. ................. | 710/260 |
| 2002/0161536 A1 | * | 10/2002 | Suh et al. ................ | 702/62 |

FOREIGN PATENT DOCUMENTS

JP          62155693 A    *    7/1987

* cited by examiner

*Primary Examiner*—Rehana Perveen
*Assistant Examiner*—Trisha Vu
(74) *Attorney, Agent, or Firm*—David W. Lynch; Chambliss, Bahner & Stophel P.C.

(57) ABSTRACT

Peripheral Component Interconnect (PCI) device contains Host Messaging Unit (HMU) which is operative to off load host processor and PCI device processor from PCI bus transfer overhead. HMU is configurable to asynchronously retrieve host processor commands from circular buffer, either by using polling or interrupt service techniques. Both host command retrieval methods are operable to remove host processor and PCI device processor from direct PCI bus command transactions, thereby increasing the efficiency of both processors. Interrupt service control of HMU is operative to buffer multiple service requests from PCI device processor, so that a more efficient use of the host processor interrupt service routine is implemented, providing for multiple service requests to be serviced in a single interrupt service request.

7 Claims, 7 Drawing Sheets

METHOD AND APPARATUS FOR HOST MESSAGING UNIT FOR PERIPHERAL COMPONENT INTERCONNECT BUSMASTER DEVICES

BACKGROUND OF THE INVENTION

1. Field of the Invention

This invention relates in general to Peripheral Component Interconnect (PCI) busmaster devices, and more particularly, to busmaster devices with enhanced command processing capability, which reduces both host processor loading and PCI device processor loading.

2. Description of Related Art

Today's computing systems have seen several decades of evolution. Evolution which has transformed one-of-a-kind, custom built machines into common, everyday appliances found in most homes today. Central processing units (CPU) which were the size of refrigerators, requiring many kilowatts (kW) of power and associated cooling, have been reduced to printed circuit board (PCB) implementations, which have proliferated the computing industry. The relatively few peripherals operated in combination with the early CPUs including tape readers, teletypes, line printers, etc., were tightly coupled to the early CPUs, which yielded highly customized computing solutions.

The integrated circuit (IC) is largely, if not wholly, responsible for the drastic reduction in the size and power requirements of the early computing solutions. In addition, the IC is largely responsible for the exponential increase in the computational capabilities of the modern day desktop computer. Through the development of the IC, not only has the CPU been reduced to printed circuit board implementations, but so have peripherals such as Random Access Memory (RAM), high resolution graphics, full motion video drivers and high bandwidth networking cards, to name only a few. Each of the peripheral applications implemented on PCB's share a common communication architecture with the CPU called the computer bus.

The computer bus allows communication between the CPU, or processor, and its peripherals. The computer bus is generally separated into several functional groups such as address, data and control. The address group of the computer bus identifies the specific peripheral attached to the computer bus as well as a particular component contained within the peripheral, such as a register or memory location. The data group of the computer bus defines the information transferred to or received from the peripheral. The control group of the computer bus defines the method or protocol used to effect data or control transfers on the computer bus.

Contemporary computer buses operate in a synchronous fashion, such that all transactions on the computer bus occur synchronously with a rising or falling edge of a master bus clock. The master bus clock, however, is typically slower than the speed of the processor attached to the bus, creating a performance bottleneck at the computer bus level. Subsequently, computer bus speeds have increased in order to reduce the performance bottleneck, but increasing computer bus speeds requires reduced computer bus lengths in order to control propagation delay. Performance of the computer bus is also limited by the number of peripheral devices attached to the computer bus. The number of peripheral devices attached to the contemporary computer bus increases the effective capacitance of the computer bus, adversely effecting computer bus transfer rates.

One of the earlier computer buses, Industry Standard Architecture (ISA), established itself as an evolutionary enhancement of the time, being well matched to processor performance and peripheral requirements of the early personal computers (PCs). The ISA computer bus, however, soon fell victim to the increasing performance demands of graphical computing. In addition, the ISA peripherals used wire jumpers and Dual In-line Package (DIP) switches to resolve Input/Output (I/O) addresses, interrupt and Direct Memory Access channel allocation, which proved to be labor intensive for the personal computer consumer.

The Video Electronics Standards Association Local (VL) bus, provided a subsequent attempt to overcome the limitations of the ISA computer bus architecture. The VL bus strategy is to attach, for example, a video controller, as well as other high bandwidth peripheral devices, directly to the processor's local bus, equating the bus speed of the peripheral device attached to the VL bus to that of the processor's bus speed. The VL bus was successful to increase the bus speeds of the peripheral devices, however, the VL bus exhibited its own shortcomings, such as a severe limitation on the number of VL bus peripheral devices allowed to operate on the VL bus. In addition, VL bus peripheral devices were necessarily processor dependent.

The Peripheral Component Interconnect (PCI) bus has been developed to provide coherence and standardization, improving upon the ISA and VL bus limitations. The PCI bus specification first appeared in 1992, with subsequent revisions published in 1993, 1995 and 1999. The PCI bus specification provides several features, which potentially allows PCI implementations to accommodate computer architectures for many years to come. PCI bus transfer rates, for example, allow for hundreds of megabytes (MB) of data to be transferred per second. Any peripheral device attached to the PCI bus can become a bus master, responsible for initiating transactions on the PCI bus, thus reducing overhead workload for the processor. The PCI bus is processor independent, such that peripheral devices attached to the PCI bus need only comply with the PCI bus specification to be operable, regardless of the specific processor being used. PCI implementations allow peripheral devices that are newly introduced to the computing architecture to be automatically configured, the automatic configuration process is more commonly referred to as plug and play. The PCI bus, however, along with its ISA and VL bus predecessors, limits the number of peripheral devices that can share a particular PCI bus segment. In order to accommodate multiple PCI peripheral devices and even to accommodate a mixture, for example, of PCI and ISA bus compatible peripheral devices, PCI bridging is used.

PCI bridging allows for expansion of the PCI bus, such that multiple PCI peripheral devices can operate on the PCI bus, but are separated into their own PCI bus segments and then bridged to allow access to the PCI bus. Several types of bridges exist, for example, such as the PCI-to-PCI, Host-to-PCI and PCI-to-legacy bus bridges. The PCI-to-PCI bridge allows multiple PCI bus segments to be interconnected, such that each segment allows a fixed number of PCI peripheral devices to be connected to the PCI bus. The Host-to-PCI bridge, or commonly referred to as the north bridge, allows the host processor to access the PCI bus, because most host processors do not provide their own PCI bus interface adapter. Finally, the PCI-to-legacy bridges, or south bridge, allows legacy systems, such as an ISA peripheral device, to access the PCI bus. Many personal computers, for example, provide hard drive data storage and I/O peripheral devices on the ISA bus, which require a PCI-to-ISA bridge for proper operation in a PCI bus implementation.

PCI bus communication protocol establishes command transfers to be conducted synchronously with a master bus clock. That is to say, that the PCI bus master clock provides the clocking signal, used in combination with other bus handshake signals, to initiate, perform and terminate a command transfer between the host processor and PCI peripheral devices. As with any synchronous command transfer on the PCI bus, only one master and one target device have control of the PCI bus at any given time. The host processor, for example, acting as a bus master, seizes the PCI bus, places a target on the address bus and a bus command on the command bus on a first rising edge of the master bus clock. All targets listening on the PCI bus latch the address and command at a second rising edge of the master bus clock. Only one target on the PCI bus can claim ownership of the command and, after a given latency period, acknowledges its ownership of the command with subsequent support of the rest of the transaction. The latency period during the host to target command transaction on the PCI bus establishes unnecessary overhead constraints on the host processor. The overhead constraints adversely affect the host processor's efficiency, which ultimately reduces the speed of operation of the PCI bus system.

PCI devices often incorporate their own processor as well, in order to carry out functions specific to the particular PCI device. Prior art PCI devices, in PCI bus communication with the host processor, often experience latency periods during the course of PCI bus command sequencing, which establish unnecessarily high loading on the PCI device processor as well. An intermediate messaging unit, established within the PCI device, responsible for direct messaging to the processor memory, would be operative to reduce the loading on both the host processor and PCI device processor as well.

It can be seen that there is a need for a method and apparatus that handles message transfers between a host processor memory and a PCI device without the direct intervention of either host or PCI device processors.

It can be seen that there is a need for a method and apparatus that handles message transfers directly from host processor memory to release both the host processor and PCI device processor from unnecessary PCI bus transaction overhead.

It can be seen that there is a need for a method and apparatus that frees the host and PCI device processors to perform other critical functions and that increases the overall efficiency of operation of the PCI bus implementation.

SUMMARY OF THE INVENTION

To overcome the limitations in the prior art described above, and to overcome other limitations that will become apparent upon reading and understanding the present specification, the present invention discloses a method and apparatus for off loading both the host processor and the PCI device processor from PCI bus transaction overhead. In particular, bus transaction overhead during host command transfer to the PCI device and the subsequent status transfer from the PCI device to the host processor is significantly reduced.

The present invention solves the above-described problems by implementing a Host Messaging Unit (HMU) used to intercede on behalf of both the host processor and PCI device processor during host command transfer and PCI device status reporting. The HMU facilitating asynchronous transfer of host commands and PCI device status information without the direct involvement of either the host processor or the PCI device processor.

An apparatus in accordance with the principles of the present invention includes a host messaging unit that includes a memory storage device, a read controller coupled to the memory storage device, the read controller being effective to asynchronously retrieve the command from the memory storage device, and a write controller coupled to the memory storage device effective to asynchronously acknowledge the command retrieval. The host processor being bypassed during both the command retrieval and the asynchronous acknowledgment of the command retrieval.

Other embodiments of an apparatus in accordance with the principles of the invention may include alternative or optional additional aspects. One such aspect of the host messaging unit in accordance with the present invention is that the read controller includes a direct memory access read engine coupled to the memory storage device, a read clock coupled to the direct memory access read engine to initiate the command retrieval from the memory storage device at predetermined intervals, and a validator coupled to the direct memory access read engine to validate the command retrieved from the memory storage device.

Another aspect of the host messaging unit in accordance with the present invention is that the read clock allows programmable predetermined intervals.

Another aspect of the host messaging unit in accordance with the present invention is that the read clock restarts the predetermined interval after the command retrieval from the memory storage device.

Another aspect of the host messaging unit in accordance with the present invention is that the validator includes a comparator to indicate an invalid command when the command is zero valued.

Another aspect of the host messaging unit in accordance with the present invention is that the read controller includes a direct memory access read engine coupled to the memory storage device, and a busmaster command engine coupled to the direct memory access read engine to initiate the command retrieval from the memory storage when the busmaster command engine is signaled by the host processor.

Another aspect of the host messaging unit in accordance with the present invention is that the busmaster command engine includes a register programmable by the host processor to indicate that the command is available to be retrieved from the memory storage device.

In another embodiment of the present invention, a peripheral component interconnect device includes a device processor, and a host messaging unit coupled to the device processor for facilitating communication between the device processor and an external device. The host messaging unit includes a read controller coupled to the device processor effective to asynchronously read a data element from the external device, and a write controller coupled to the device processor effective to asynchronously acknowledge the asynchronous read. The device processor is bypassed during both the asynchronous read and the asynchronous acknowledgment of the asynchronous read.

Another aspect of the peripheral component interconnect device according to the present invention is that the read controller includes a direct memory access read engine coupled to read the data element from the external device, a read clock coupled to the direct memory access read engine to initiate the data element retrieval from the external device at predetermined intervals, and a validator coupled to the direct memory access read engine to validate the data element retrieved from the external device.

Another aspect of the peripheral component interconnect device according to the present invention is that the read clock allows programmable predetermined intervals.

Another aspect of the peripheral component interconnect device according to the present invention is that the read clock restarts the predetermined interval after the data element retrieval from the external device.

Another aspect of the peripheral component interconnect device according to the present invention is that the validator includes a comparator to indicate an invalid data element when the data element is zero valued.

Another aspect of the peripheral component interconnect device according to the present invention is that the read controller includes a direct memory access read engine coupled to the external device, and a busmaster command engine coupled to the direct memory access read engine to initiate the data element retrieval from the external device when the busmaster command engine is signaled by the external device.

Another aspect of the peripheral component interconnect device according to the present invention is that the busmaster command engine comprises a register programmable by the external device to indicate that the data element is available to be retrieved from the external device.

In another embodiment of the present invention, in a computer system, a host processor is coupled through a peripheral component interconnect bus to a peripheral component interconnect device. The peripheral component interconnect device includes a host messaging unit for facilitating communication between the host processor and the peripheral component interconnect device. The host messaging unit includes a read controller coupled to the host processor effective to asynchronously retrieve host processor commands from the host processor, and a write controller coupled to the host processor effective to asynchronously acknowledge the command retrieval. The host processor being bypassed during both the command retrieval and the asynchronous acknowledgment of the command retrieval.

Another aspect of the computer system including a peripheral component interconnect device according to the present invention is that the read controller includes a direct memory access read engine coupled to the host processor, a read clock coupled to the direct memory access read engine to initiate the command retrieval from the host processor at predetermined intervals, and a validator coupled to the direct memory access read engine to validate the command retrieved from the host processor.

Another aspect of the computer system including a peripheral component interconnect device according to the present invention is that the read clock allows programmable predetermined intervals.

Another aspect of the computer system including a peripheral component interconnect device according to the present invention is that the read clock restarts the predetermined interval after the command retrieval from host processor.

Another aspect of the computer system including a peripheral component interconnect device according to the present invention is that the validator includes a comparator to indicate an invalid command when the command is zero valued.

Another aspect of the computer system including a peripheral component interconnect device according to the present invention is that the read controller includes a direct memory access read engine coupled to the host processor, and a busmaster command engine coupled to the direct memory access read engine to initiate the command retrieval from the host processor when the busmaster command engine is signaled by the host processor.

Another aspect of the computer system including a peripheral component interconnect device according to the present invention is that the busmaster command engine comprises a register programmable by the host processor to indicate that the command is available to be retrieved from the host processor.

In another embodiment of the present invention, a method of asynchronously servicing a peripheral component interconnect device includes bypassing a host processor to access host commands from host memory, using the host memory to signal the access of the host commands and providing status to the host processor after execution of the host commands, wherein the status is provided at predetermined intervals.

Another aspect of the method of asynchronously servicing a peripheral component interconnect device according to the present invention is that the host processor is allowed to write the host commands to the host memory and the host memory is polled for valid host commands at predetermined intervals.

Another aspect of the method of asynchronously servicing a peripheral component interconnect device of the present invention is using the host memory to signal the access of the host commands comprises writing zero valued data to the host memory containing the host commands.

Another aspect of the method of asynchronously servicing a peripheral component interconnect device of the present invention is providing status to the host processor is interrupt driven.

Another aspect of the method of asynchronously servicing a peripheral component interconnect device of the present invention is that the interrupt driven status uses an interrupt pin to notify the host processor.

Another aspect of the method of asynchronously servicing a peripheral component interconnect device of the present invention is that the interrupt driven status uses message signaled interrupts to notify the host processor.

Another aspect of the method of asynchronously servicing a peripheral component interconnect device of the present invention is allowing the host processor to write the host commands to the host memory, and interrupting the peripheral component interconnect device when the host commands are available in the host memory.

Another aspect of the method of asynchronously servicing a peripheral component interconnect device of the present invention is writing a logic value to a register within the peripheral component interconnect device.

In another embodiment, a method reducing bus transfer overhead between a host processor and a peripheral component interconnect device processor in accordance with the principles of the present invention includes writing host processor commands to a memory storage device, bypassing the peripheral component interconnect device processor to signal the existence of the host processor commands, and bypassing the host processor to access the host processor commands from the memory storage device.

Another aspect of the method of reducing bus transfer overhead of the present invention is using a host messaging unit to poll for host processor commands at predetermined intervals.

Another aspect of the method of reducing bus transfer overhead of the present invention is interrupting the host messaging unit when the host commands are available in the memory storage device.

Another aspect of the method of reducing bus transfer overhead of the present invention is using a direct memory access read engine to retrieve host processor commands from the memory storage device, and using a direct memory access write engine to signal the host processor that the host processor commands are retrieved.

In another embodiment of the present invention, an article of manufacture including a program storage medium readable by a computer. The medium tangibly embodying one or more programs of instructions executable by the computer to perform a method reducing bus transfer overhead between a host processor and a peripheral component interconnect device processor. The method including writing host processor commands to a memory storage device, bypassing the peripheral component interconnect device processor to signal the existence of the host processor commands, and bypassing the host processor to access the host processor commands from the memory storage device.

In another embodiment of the present invention, a peripheral component interconnect device including a device processing means, and a host messaging means coupled to the device processing means for facilitating communication between the device processing means and an external device. The host messaging means including a read controlling means coupled to the device processing means effective to asynchronously read a data element from the external device, and a write controlling means coupled to the device processing means effective to asynchronously acknowledge the asynchronous read, wherein the device processing means is bypassed during both the asynchronous read and the asynchronous acknowledgment of the asynchronous read.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an asynchronous method to accommodate PCI bus command transfers from host processor memory without requiring the host processor or PCI device processor to directly participate in PCI bus transfer overhead. The host processor maintains a circular buffer in host processor memory, to which PCI device commands are stored. The PCI device commands are of configurable size and are asynchronously accessible by a Host Messaging Unit (HMU). The HMU polls for the existence of host commands or, alternately, is interrupted when commands are available within the circular buffer. Once host commands are available in the circular buffer, the HMU reads the commands from the circular buffer in host memory. Once the host commands have been read and validated, the HMU clears the circular buffer memory to inform the host that the command has been read and that the memory used is ready for reuse. The HMU, therefore, allows host commands to be retrieved without any direct signaling between the host processor and PCI device processor and allows a bus master to obtain host service without direct signaling from the bus master processor.

Figure 1:
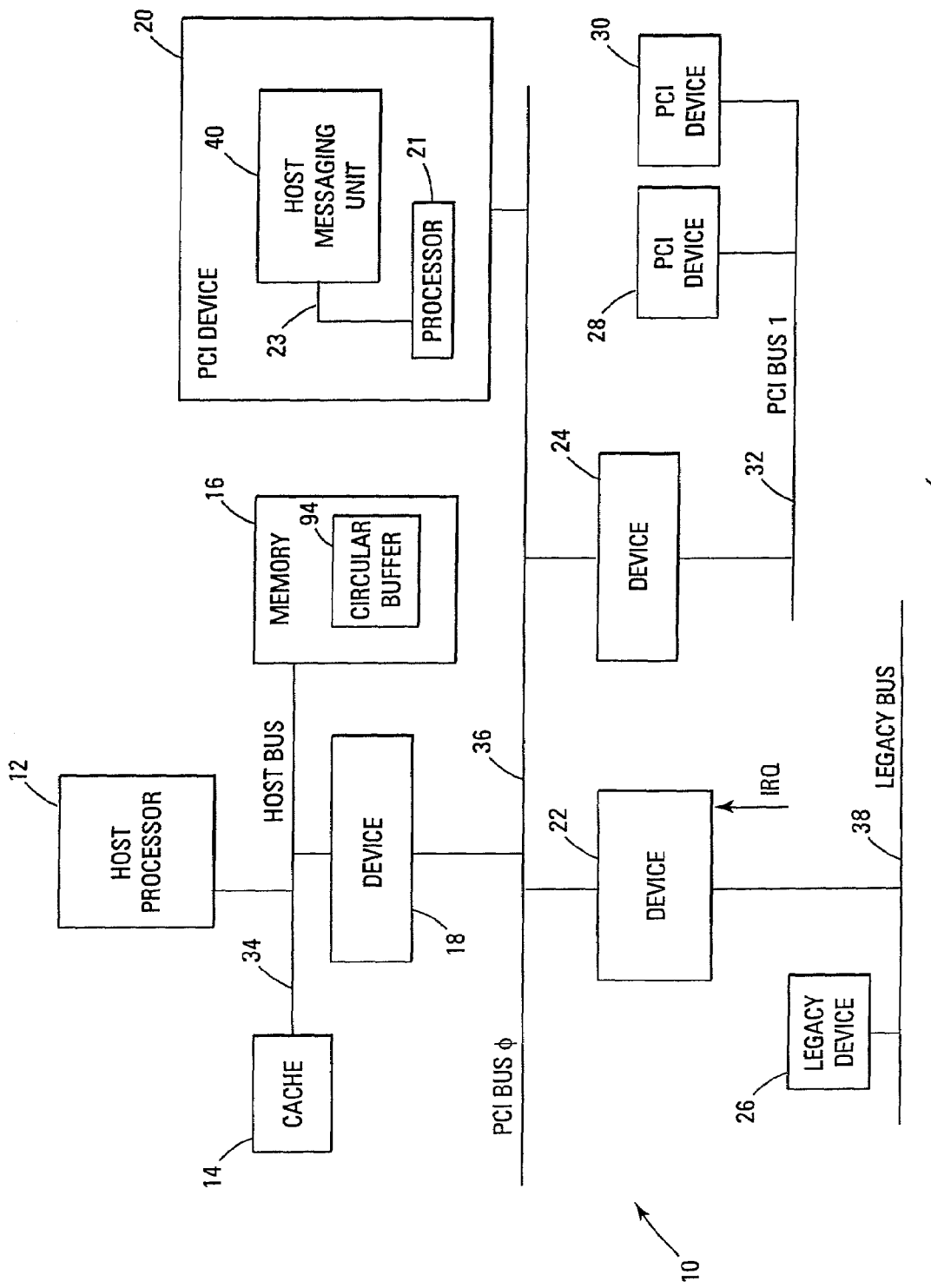
FIG. 1 illustrates a typical PCI bus implementation.

FIG. 1 illustrates a block diagram of an exemplary PCI bus implementation 10 using a bridge hierarchy to accommodate PCI bus interconnection of host processor 12, PCI devices 20, 28 and 30, and ISA device 26. PCI device 20 is connected to PCI bus 0 36 and communicates with host processor 12 through device 18. HMU 40 exists within PCI device 20 and also has access to PCI bus 0 36 and communicates with host processor 12 through device 18. Legacy device 26 is connected to legacy bus 38 and communicates with host processor 12 via device 22 and device 18. Host processor 12 utilizes cache 14 and memory 16 for memory operations via host bus 34. Devices 18, 22 and 24 implement the required bridges, memory controllers, interrupt controllers, bus arbiters, etc. for proper PCI bus communication management.

PCI devices 20, 28 and 30 may consist of a complete peripheral adapter encapsulated within an IC package or integrated onto a PCI expansion card. Typical examples of PCI devices 20, 28 and 30 include networking adapters, display adapters or Small Computer Systems Interface (SCSI) adapters, to name only a few. Each of PCI devices 20, 28 and 30 may act as bus masters, in which they each may initiate PCI transactions when acting as bus masters. Arbiters contained within devices 18 and 24 arbitrate PCI bus 0 36 and PCI bus 1 32, so that PCI devices 20, 28 and 30, acting as bus masters, do not conflict with each other. Legacy device 26 may be any device requiring to be interoperable with the PCI bus, such as ISA or VL devices. Legacy devices could be, for example, representative of I/O devices that provide input services such as keyboard and mouse operations, as well as two way operations with hard disk drives and serial I/O ports.

HMU 40 is contained within PCI device 20 and is operative in accordance with the present invention to relieve host processor 12 and PCI device processor 21 from being directly involved with PCI bus transactions, for command delivery and service requests, on PCI bus 0 36. One motivation for utilizing HMU 40 internal to PCI device 20 is to reduce the loading of host processor 12 to the extent that host processor 12 is no longer required to arbitrate for bus time on PCI bus 0 36 in order to transfer PCI commands to PCI device 20. Direct command transfers from host processor 12 to PCI device 20 can potentially stall host processor 12 while host processor 12 waits for the command transfer to complete. HMU 40 is also responsible for reducing the load of PCI device processor 21, because PCI device processor 21 is no longer responsible for directly accessing host processor commands from host processor memory 16. HMU 40 is said to intercede for host processor 12 and PCI device processor 21, by adopting the role of asynchronously transferring host processor commands from host processor memory 16 to PCI device 20. HMU 40 intercession is also required once the host processor command has been processed by PCI device 20 and status reported back to host processor 12, in order to insure prompt status acknowledgment to PCI device 20 by host processor 12.

An alternate embodiment of HMU 40 may be desirable such that HMU 40 is external to PCI device 20. In such an embodiment, HMU 40 would not necessarily be dedicated to one particular PCI device, but would intercede on behalf of multiple PCI devices on a particular PCI bus segment. The multiple PCI devices perhaps being legacy PCI devices, which do not contain HMUs themselves, but would potentially profit from such an external HMU.

PCI devices 28 and 30 incorporate internal HMUs (not shown), as illustrated for PCI device 20, operative in similar fashion to off load bus transaction overhead between host processor 12 and PCI device processors contained within PCI devices 28 and 30. HMU 40 provides a Direct Memory Access (DMA) engine, which allows asynchronous access to circular buffer 94 contained within memory 16. Host processor 12 supplies fixed length commands to circular buffer 94 contained within memory 16. The length of the host processor commands being configurable to any size, for example, 64 bytes. The length of the host processor commands is completely application dependent and may call for shorter or longer host processor command lengths as necessary. HMU 40 is alerted to the existence of commands in circular buffer 94 either by direct signaling from host processor 12 or alternately through polling by HMU 40. HMU 40 provides the capability to poll memory 16 at regular intervals, in order to determine the existence of commands within circular buffer 94. As commands are retrieved from circular buffer 94, HMU 40 screens the commands for validity. Once validated, the portion of the circular buffer containing the retrieved command is cleared so as to signal the host processor that the command has been read and then the retrieved command is delivered to PCI device processor 21 for processing. Once PCI device 20 has performed the action required by the command, PCI device 20 returns status to host processor 12.

Figure 2:
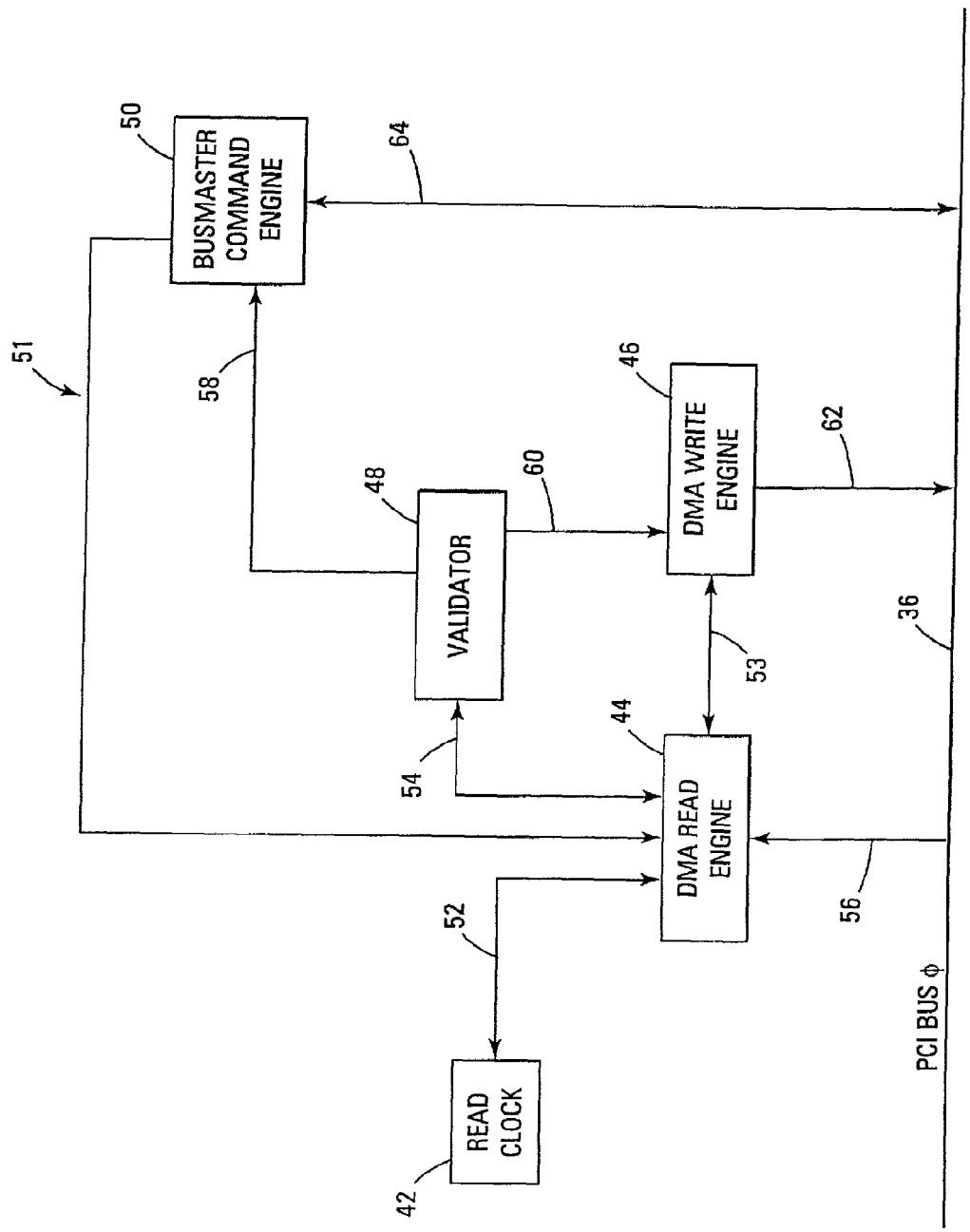
FIG. 2 illustrates a block diagram of the Host Messaging Unit of FIG. 1.

FIG. 2 illustrates an exemplary block diagram of HMU 40. DMA Read and DMA Write engines 44 and 46, respectively, are memory mapped to host processor memory 16. More particularly, DMA read engine 44 and DMA write engine 46 are mapped to the portion of memory 16, which contains circular buffer 94 used by host processor 12 to store host commands bound for PCI device 20. In addition, host processor 12 manages separate circular buffers (not shown) for each of PCI devices 28 and 30. Read clock 42 optionally signals DMA read engine 44 to read from circular buffer 94 at regular intervals as necessary. Read clock 42 and DMA read engine 44 combine to form a first method to gain access of host processor commands from circular buffer 94. A second mode of host processor command access is implemented through the combination of busmaster command engine 50 and DMA read engine 44. Validator 48 is used to determine the validity of a command retrieved from circular buffer 94 in both modes of host processor command access, in which validator 48 contains a comparator operable to detect a zero valued command. If the command is zero valued, the comparator indicates that the command is not valid.

Figure 3:
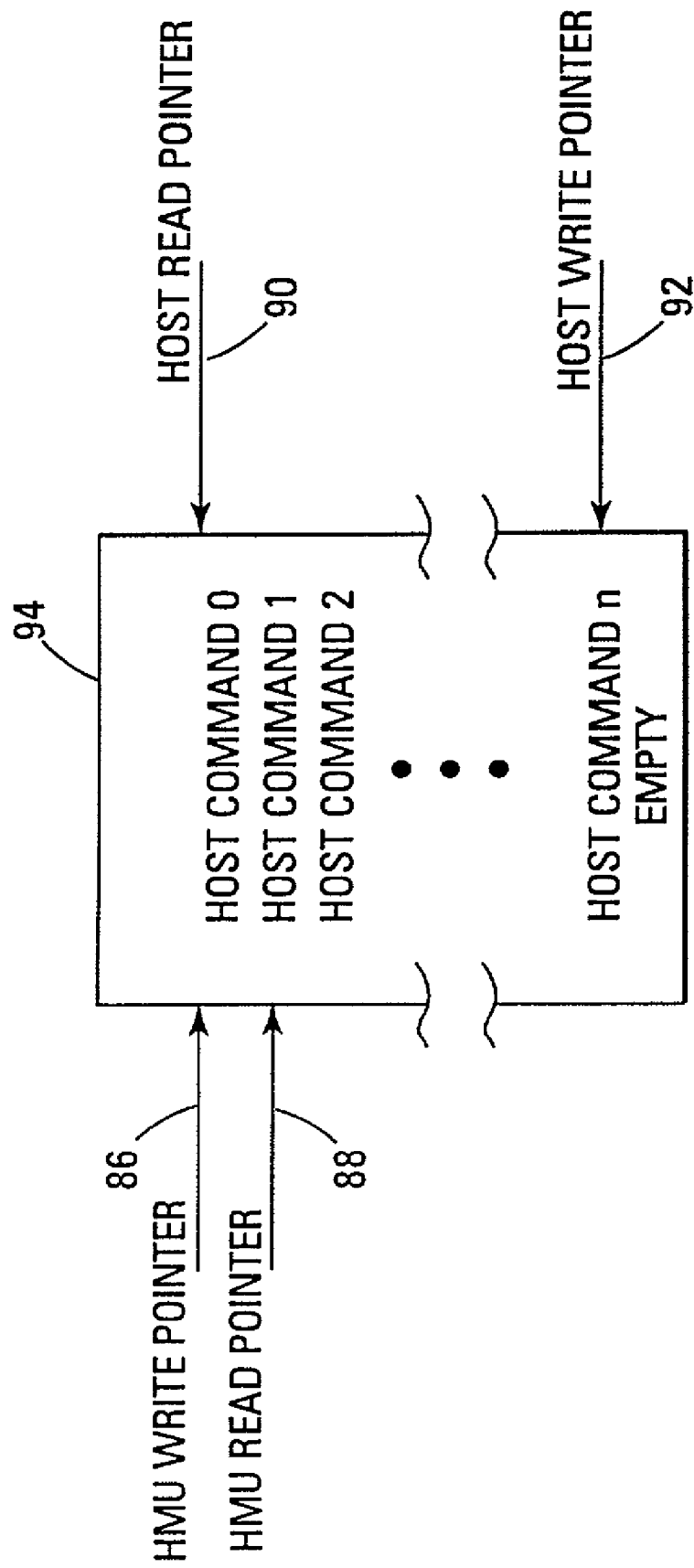
FIG. 3 illustrates the circular buffer of FIG. 1.

FIG. 3 illustrates circular buffer 94, which contains host commands 0-n intended for PCI device 20. Host commands 0, 1, 2, . . . , n are sequentially arranged in ascending order and are configured to be of a fixed size, the size of host commands 0–n being configurable. DMA write engine 46 of HMU 40 maintains write pointer 86 to be indicative of the next location within circular buffer 94 that is ready to be cleared. Likewise, DMA read engine 44 of HMU 40 maintains read pointer 88 to be indicative of the next location within circular buffer 94 that contains the next potential host processor command to be read. Similarly, host processor 12 maintains read and write pointers 90 and 92. Host processor 12 writes the next command starting from the location indexed by write pointer 92 and obtains command read status using read pointer 90.

As can be seen from FIGS. 1, 2 and 3, DMA read engine 44 requires memory read access to circular buffer 94, in order to implement host command transfers from circular buffer 94 to PCI device processor 21. Similarly, DMA write engine 46 requires memory write access to circular buffer 94, as discussed below, to signal a successful command transfer from circular buffer 94 to PCI device processor 21.

Figure 4:
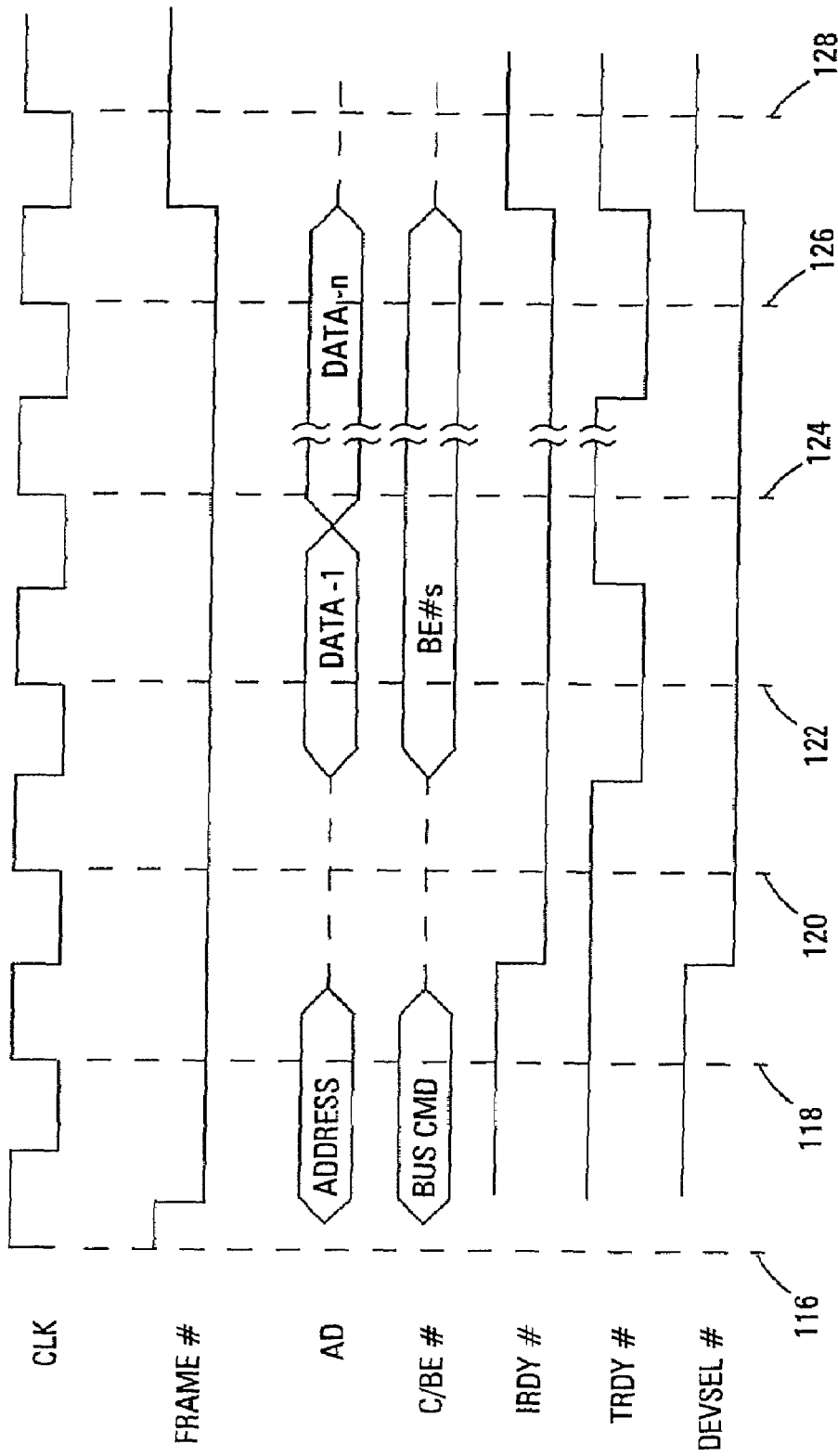
FIG. 4 illustrates a typical timing diagram for a memory read transfer using the PCI bus implementation of FIG. 1.

FIG. 4 represents the timing diagram of a typical read transaction on PCI bus 0 36, initiated by DMA read engine 44. Signal names used in the timing diagram of FIG. 4 are defined in the PCI bus standard. At time 116, PCI bus 0 36 is idle. The busmaster, DMA read engine 44, has arbitrated for and obtained bus control and subsequently drives signal FRAME# to a logic low value. DMA read engine 44 then places memory address, ADDRESS, on the AD bus corresponding to, for example, the memory location indexed by HMU read pointer 88 in FIG. 3. DMA read engine 44 also places the appropriate bus command, BUS CMD, on the C/BE# bus, indicating a memory read. Device 18 latches the ADDRESS and BUS CMD at time 118. Signal IRDY# is asserted to acknowledge that DMA read engine 44 is available to accept read data from circular buffer 94. Because device 18 provides memory control for circular buffer 94, device 18 acts as the target and asserts signal DEVSEL#. A turnaround cycle occurs at time 120, denoting a shift in the device that is driving the AD address lines. Prior to time 120, an address phase is denoted, where DMA read engine 44 drives the AD address lines. After time 120, a data phase is denoted, where device 18 drives the AD address lines. Device 18 latches the first portion of host command 1 indexed by HMU read pointer 88 and asserts signal TRDY#, signifying that data is available to be read. DMA read engine 44 latches DATA-1, representing a first portion of host command 1, at time 122 and device 18 de-asserts signal TRDY# indicating that the next data element, or next portion of host command 1, is not available. Data transfer continues through time 126, where the last data element DATA-n, representing the last portion of host command 1, has been placed on the AD bus by device 18 and latched by DMA read engine 44. DMA read engine then de-asserts IRDY# and FRAME# to indicate the end of the data transfer.

A write cycle is also required on PCI bus 0 36, where DMA write engine 46 acts as the busmaster, while device 18/circular buffer 94 act as the target. The data transfer is conducted similarly to that shown in FIG. 4, except that turnaround cycles are not required, because DMA write engine 46 writes the AD bus in both the data and address phases of the data transfer. Both the read and write cycles explained above are used in first and second modes of direct memory access discussed below in relation to HMU 40.

A first mode of direct memory access performed by HMU 40 is optionally configured to be a polled mode of operation. The polled mode of operation is initiated through a polling feature provided by read clock 42. Read clock 42 is configured to provide read pulses to DMA read engine 44 via bus 52. Upon receipt of a read pulse from read clock 42, DMA read engine 44 arbitrates for bus access to PCI bus 0 36. Once PCI bus 0 access has been obtained, a direct memory read is conducted by DMA read engine 44 from circular buffer 94, indexed by read pointer 88. The contents of circular buffer 94, indexed by read pointer 88, are retrieved and delivered to validator 48 via bus 54. Validator 48 accumulates data retrieved by DMA read engine 44 until an entire host command can be assembled. Once assembled, validator 48 checks the host command to verify validity. A valid command, for example, may be indicated by any non-zero data bit contained within the host command. Once validated, validator 48 confirms validation to DMA read engine 44, which subsequently increments HMU read pointer 88 to index the next host command which may be available within circular buffer 94. In addition, validator 48 signals DMA write engine 46 that a valid command access has occurred. DMA write engine 46 writes all zero valued data to the portion of circular buffer memory that contained the last host command read, in order to signify to host processor 12 that valid command data has been obtained from circular buffer 94. Host processor 12 monitors data indexed by host read pointer 90 in order to determine whether or not that portion of memory indexed by host read pointer 90 has been read by DMA read engine 44.

Figure 5:
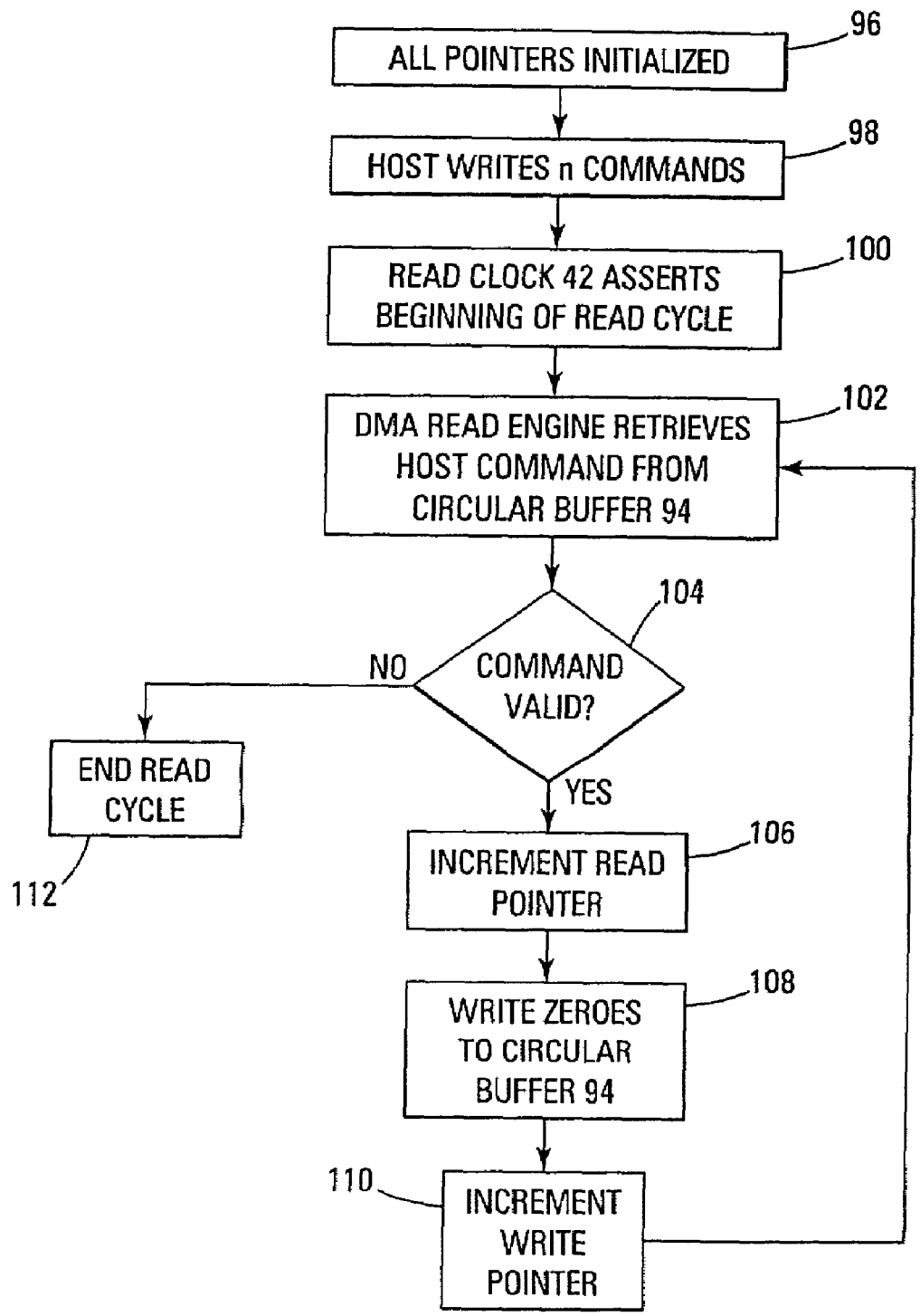
FIG. 5 illustrates a flow diagram of an asynchronous host command transfer.

FIG. 5 illustrates an exemplary flow diagram of the polled mode direct memory access read of circular buffer 94. HMU read and write pointers 86 and 88 along with host read and write pointers 90 and 92 are initialized to index to host command 0 location within circular buffer 94 at step 96. Host processor 12 writes n host commands to circular buffer 94 at step 98, leaving host write pointer 92 indexed to host command n within circular buffer 94. Read clock 42 asserts the beginning of a polled read cycle in step 100. In response to read clock 42, DMA read engine 44 accesses host command 0 at step 102, in accordance with the memory read transfer discussed above. Validator 48 receives host command 0 and validates host command 0 at step 104. Host command 0 is valid, for example, if any bit within host command 0 has a non-zero logic level. If host command 0 is a valid command, HMU read pointer 88 is incremented to index host command 1 at step 106. All zeroes are written to the host command 0 location which is indexed by HMU write pointer 86, in step 108. HMU write pointer 86 is then incremented to index host command 1 in step 110, which causes steps 102–110 to be repeated to retrieve host commands 1 through n. Once host command n has been retrieved from circular buffer 94, retrieval of host command n+1 will result in a non-valid command, e.g. all zero valued data bits, and the polled read cycle terminates at step 112. Once all host commands have been retrieved from circular buffer 94 and verified, PCI device processor 21 receives the host commands from HMU 40 via bus 23 and normal PCI device processing commences. It should be noted that the polled host command read cycle requires no direct interaction between host processor 12 and PCI device processor 21, such that all host command read and write operations to circular buffer 94 conducted by HMU 40 are implemented in an asynchronous fashion. The asynchronous memory read and write operations operative to reduce the loading on both host processor 12 and PCI device processor 21.

A second mode of direct memory access implemented by HMU 40 and host processor 12 is an interrupt driven read cycle. HMU 40 may optionally be configured to initiate the circular buffer read cycle when host processor 12 completes the host command write cycle to circular buffer 94. Host processor 12 initiates the interrupt driven read cycle by setting one or more bits of a control register implemented within busmaster command engine 50, after the last command is written to circular buffer 94 by host processor 12, according to the memory write transfer discussed above. In so doing, host processor 12 signals to HMU 40 that the host processor write cycle is complete. Once notified of the completion of the host processor write cycle, busmaster command engine 50 instructs DMA read engine 44 to commence the direct memory read cycle depicted in FIG. 5 starting at step 102.

Figure 6:
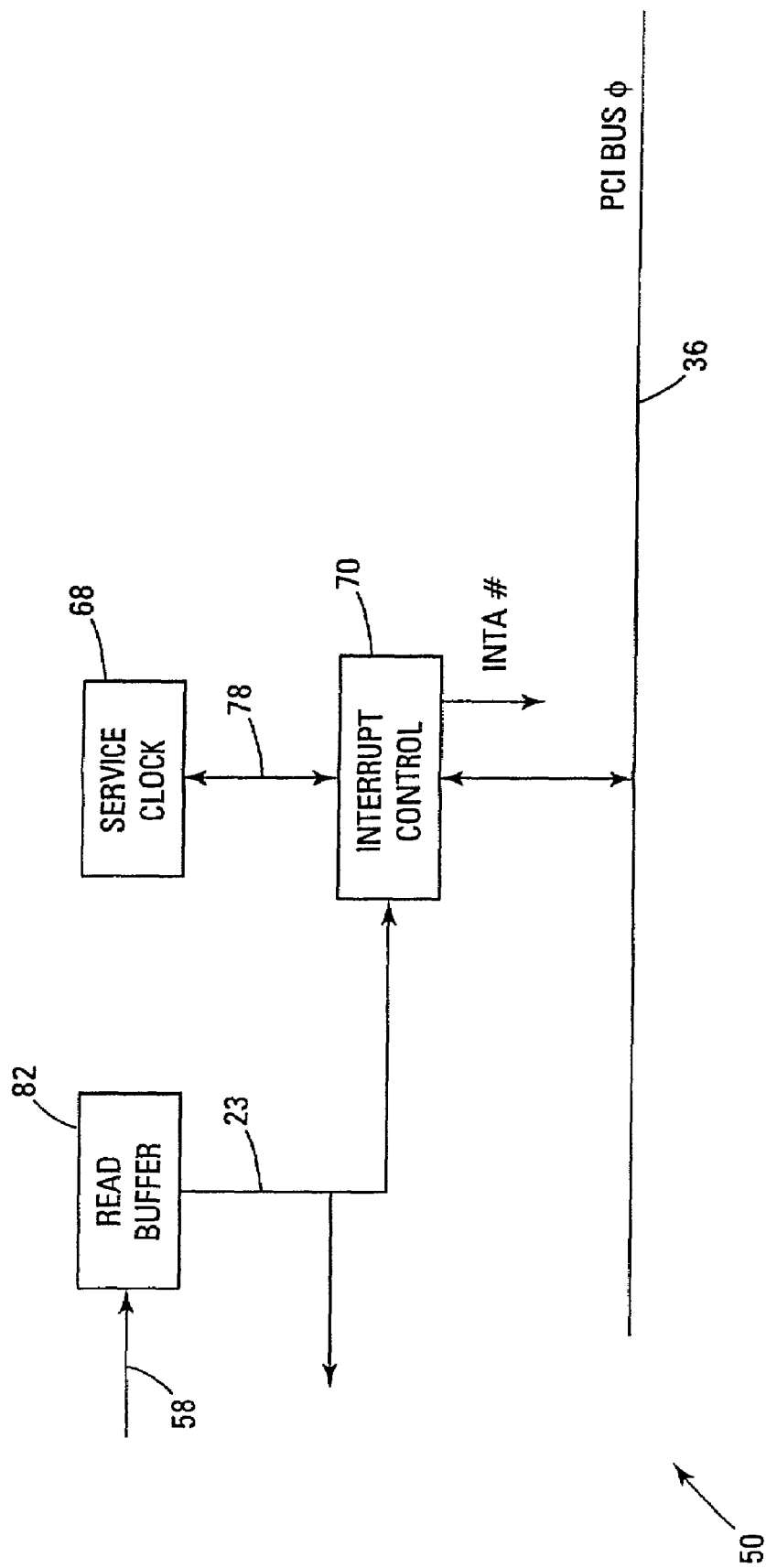
FIG. 6 illustrates a block diagram of the busmaster command engine of FIG. 2.

FIG. 6 illustrates an exemplary block diagram of busmaster command engine 50. Read buffer 82 is configured to receive validated host commands from validator 48 via bus 58. Once a complete command has been received by read buffer 82, read buffer 82 transfers the host command to PCI device processor 21 via bus 23 and PCI device processor 21 then executes the host command. Once the host command is executed, command status is ready to be serviced by host processor 12. Service clock 68 and interrupt control 70 collaborate to initiate the command status service routine performed by host processor 12.

A first method used to initiate the command status service routine performed by host processor 12 is through interrupt signaling using the INTA# pin. Interrupt control 70 receives service requests from PCI processor 21 once PCI processor 21 finishes execution of a host command. In order to off load host processor 12, however, interrupt control 70 does not assert signal INTA# immediately. Instead, interrupt control 70 requests service only when service clock 68 indicates that a configurable amount of time has transpired, at which time, interrupt control 70 asserts signal INTA# which is intercepted by device 18, initiating a host processor interrupt service routine. Interrupt service control 70 is operative to off load host processor 12, because interrupt service control 70 effectively buffers all service requests from PCI device processor 21 until a configurable amount of time has transpired. Multiple service requests from PCI device 21, for example, may be buffered by interrupt control 70, such that host processor 12 need only be interrupted once to handle the multiple buffered service requests. Accordingly, host processor 12 is significantly off loaded by interrupt control 70. Once the multiple service requests have been serviced by host processor 12, host processor 12 resets service clock 68, which is effective to restart service clock 68 to count down the next configurable amount of time before the next interrupt service request is needed. As discussed above, a control register (not shown) contained within interrupt control 70 may be written to by host processor 12 using a memory write transfer, in order to reset service clock 68.

A second method used to initiate the command status service routine performed by host processor 12 is through Message Signaled Interrupts (MSI) as introduced in Revision 2.2 of the PCI specification. The MSI eliminates the need for separate interrupt pins and associated PCB traces, because host processor 12 is interrupted using PCI bus messaging. Interrupt control 70 and service clock 68 are operative to buffer service requests from PCI device processor 21 until a configurable amount of time transpires, as discussed above, at which time interrupt control 70 initiates MSI service handling via PCI bus 0 36 to initiate service from host processor 12.

The MSI is generated by interrupt control 70 by establishing a memory write, as discussed above, via PCI bus 0 36 to a predetermined memory location using a predetermined data value. At start up time, configuration software executing on host processor 12 executes the basic MSI configuration features for PCI device 20. The configuration software scans PCI bus 0 36, a process known as bus enumeration, to discover PCI device 20. Upon detection, the configuration software checks the capabilities list bit in a status register (not shown) of PCI device 20, to check for new capabilities supported by PCI device 20. The configuration software traverses the capabilities list and searches for a hex valued capability id of "05h", as specified in PCI specification version 2.2, signifying that PCI device 20 is MSI capable. The configuration software then assigns a memory address and writes the memory address into the message address register (not shown) of PCI device 20. The configuration then assigns a message data pattern to PCI device 20 and writes the message data pattern into the message data register (not shown) of PCI device 20. Finally, the configuration software sets the MSI enable bit in the message control register (not shown) of PCI device 20, thereby enabling PCI device 20 to generate interrupts using MSI memory writes. MSI configuration for PCI devices 28 and 30 is implemented in the same fashion. Interrupt control 70, therefore, initiates a memory write to the address specified in the message address register using the message data pattern stored in the message data register, in order to initiate an MSI service request from host processor 12.

Figure 7:
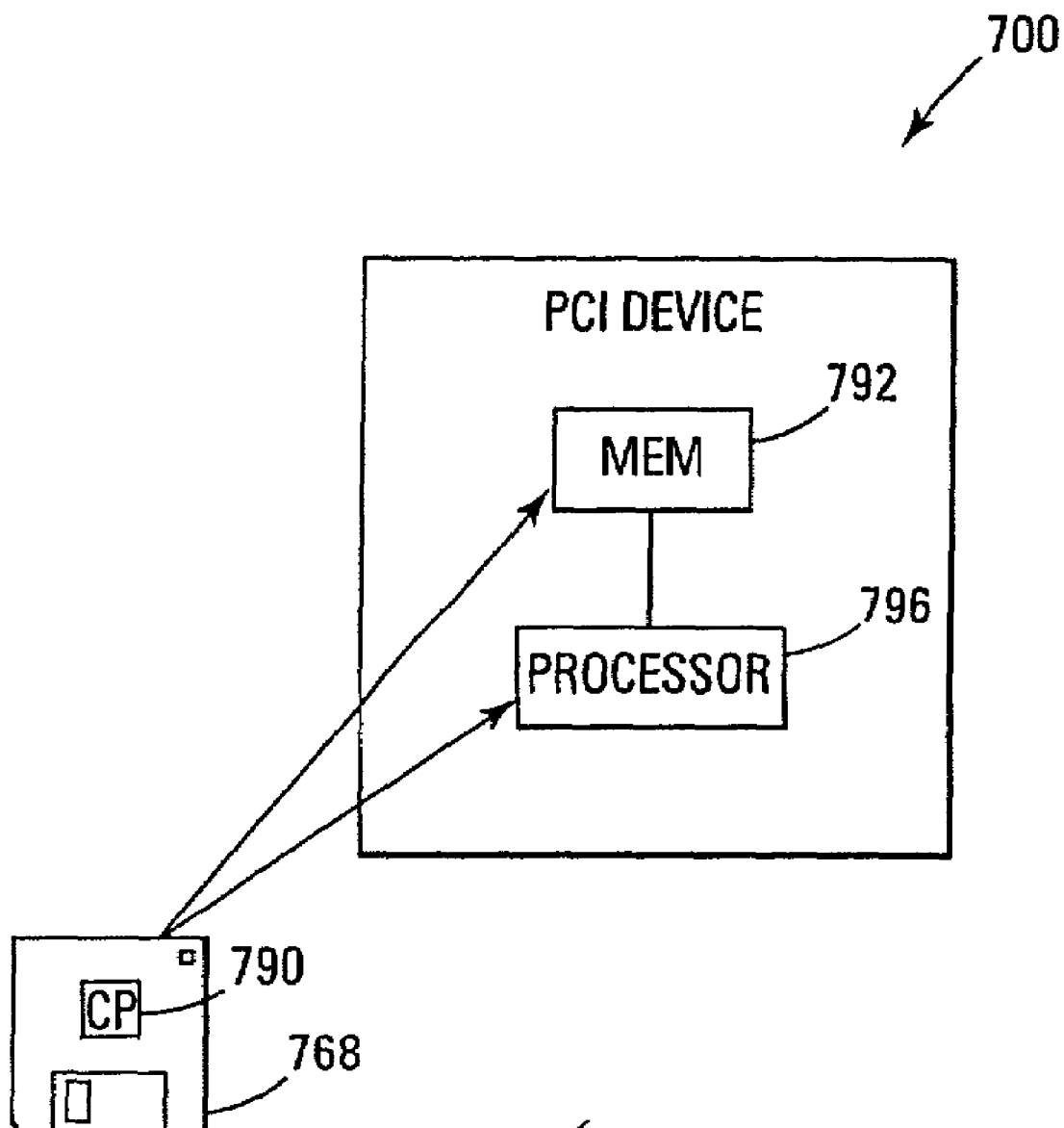
FIG. 7 illustrates a PCI device that is configured for operation using an executable program readable from a storage medium by a computer.

FIG. 7 illustrates PCI device 700 according to the present invention, wherein the process illustrated with reference to FIGS. 1–6 may be tangibly embodied in a computer-readable medium or carrier, e.g. one or more of the fixed and/or removable data storage devices 768 illustrated in FIG. 7, or other data storage or data communications devices. A computer program 790 expressing the processes embodied on the removable data storage devices 768 may be loaded into the memory 792 and executed by processor 796, to configure PCI device 700 of FIG. 7, for execution. The computer program 790 comprises instructions which, when read and executed by PCI device 700 of FIG. 7, causes PCI device 700 to perform the steps necessary to execute the steps or elements of the present invention In summary, PCI implementations typically involve both the host processor and the PCI device processor during host command transactions on the PCI bus. According to the present invention, HMU 40 is introduced that off loads both host processor 12 and PCI device processor 21 of host command and service request transaction overhead, thereby increasing the efficiency of host processor 12 and PCI device processor 21. Thus, one advantage of the present invention enables two methods of asynchronous host command retrieval by HMU 40. Additionally, HMU 40 implements two service request methods, once the host commands are executed, effective to reduce the overhead of host processor 12.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system providing peripheral component device interconnection, comprising:
    a peripheral device processor for controlling operation of the peripheral device; and
    a host messaging unit, coupled to the peripheral device processor, but separate from the peripheral device processor, the host messaging unit retrieving host commands from a host memory of a host separate from the host messaging unit without the use of the processor of a peripheral device, validating the retrieved host commands and signaling to the host memory a successful asynchronous transfer of the host commands from host memory to the processor of the peripheral device;
    wherein the host messaging unit comprises:
        a read controller, coupled to the bus, for determining when the host commands have been provided to the host memory and for retrieving the host commands directly from the host memory via direct memory access asynchronous to the operation of the host processor and the peripheral device;
        a write controller, coupled to the bus and to the read controller, the write controller clearing the host memory to allow the host to infer that the host command has been read by the host messaging unit;
        a validator, coupled to the write controller and the read controller, the validator determining a validity of host commands retrieved from the host memory;
        a read clock, coupled to the read controller, the read clock providing a signal for initiating reading of host commands from the host memory by the read controller; and
        a busmaster command engine, coupled to the validator, read controller and bus, the busmaster command engine initiating the command retrieval from the host memory when the busmaster command engine receives a signal from the host indicating host commands are available in the host memory.

2. The system of claim 1, wherein the host messaging unit retrieves host commands from a host memory of the host without adding process loading to a host processor of the host.

3. The system of claim 1, wherein the host messaging unit provides signaling between the peripheral device and the discrete host asynchronous to operation of the host and the peripheral device.

4. The system of claim 1, wherein the host messaging unit is disposed external to the peripheral device and provides signaling between a plurality of processors of peripheral devices and the host, the operation of the host messaging unit being asynchronous to operation of the host and the processors of the peripheral devices.

5. The system of claim 1, wherein the busmaster command engine comprises a register programmable for indicating that the command is available to be retrieved from the host memory.

6. The system of claim 1, wherein the read clock is programmable to allow predetermined retrieval intervals.

7. The system of claim 1, wherein the read clock restarts the predetermined interval after the host commands are retrieved from the host memory.

* * * * *